(12) United States Patent
Fukuhara

(10) Patent No.: US 11,640,728 B2
(45) Date of Patent: May 2, 2023

(54) IN-VEHICLE INFORMATION DEVICE, VEHICULAR SERVER, SERVER SYSTEM, AND INFORMATION TRANSMISSION METHOD FOR IN-VEHICLE INFORMATION DEVICE

(71) Applicant: MITSUBISHI ELECTRIC CORPORATION, Tokyo (JP)

(72) Inventor: Hideki Fukuhara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 487 days.

(21) Appl. No.: 16/604,720

(22) PCT Filed: May 30, 2017

(86) PCT No.: PCT/JP2017/020068
§ 371 (c)(1),
(2) Date: Oct. 11, 2019

(87) PCT Pub. No.: WO2018/220705
PCT Pub. Date: Dec. 6, 2018

(65) Prior Publication Data
US 2020/0160621 A1 May 21, 2020

(51) Int. Cl.
*G07C 5/00* (2006.01)
*H04W 4/44* (2018.01)
(Continued)

(52) U.S. Cl.
CPC .............. *G07C 5/008* (2013.01); *H04W 4/44* (2018.02); *H04W 72/21* (2023.01)

(58) Field of Classification Search
CPC .... G07C 5/008; H04W 4/44; H04W 72/0413; H04W 4/46; H04W 28/10; H04W 48/06; H04W 72/21; G08G 1/01; G08G 1/09
See application file for complete search history.

(56) References Cited

U.S. PATENT DOCUMENTS

2003/0124974 A1* 7/2003 Asami .................... H04H 20/57
455/3.04
2009/0116434 A1 5/2009 Lohr et al.
(Continued)

FOREIGN PATENT DOCUMENTS

CN 1859765 A 11/2006
JP 5279929 B2 9/2013
(Continued)

OTHER PUBLICATIONS

Ukai Hiroki, WO2014061232—Vehicle Information Processing Device, 2014 (Year: 2014).*
(Continued)

*Primary Examiner* — Rachid Bendidi
(74) *Attorney, Agent, or Firm* — Birch, Stewart, Kolasch & Birch, LLP

(57) ABSTRACT

A transmission determination unit determines whether or not transmission of common information is impossible, by using a throughput that is required when the common information is transmitted, a throughput that is estimated from a communication state with a vehicular server, and a processing load of an in-vehicle information device. A transmission unit transmits vehicle-side information to the vehicular server at a set transmission timing, and, when the above transmission is determined to be impossible by the transmission determination unit, transmits a transmission impossible message to the vehicular server.

8 Claims, 10 Drawing Sheets

(51) Int. Cl.
   *H04W 72/00*    (2023.01)
   *H04W 72/21*    (2023.01)

(56)        References Cited

U.S. PATENT DOCUMENTS

| | | | | |
|---|---|---|---|---|
| 2013/0039357 A1* | 2/2013 | Akita | ............ | H04W 4/46 |
| | | | | 370/338 |
| 2013/0282267 A1* | 10/2013 | Rubin | ............ | H04W 4/48 |
| | | | | 701/301 |
| 2018/0184245 A1* | 6/2018 | Park | ............ | H04W 4/023 |
| 2020/0249670 A1* | 8/2020 | Takemura | ............ | G08G 1/0141 |

FOREIGN PATENT DOCUMENTS

| | | | | |
|---|---|---|---|---|
| WO | WO 2013/179557 A | 12/2013 | | |
| WO | WO-2013179557 A1 * | 12/2013 | ............ | H04W 4/046 |
| WO | WO-2014061232 A1 * | 4/2014 | ............ | G08G 1/01 |

OTHER PUBLICATIONS

Fujii Hideyuki, WO2013179557—Wireless Device, 2013 (Year: 2013).*

Office Action dated Aug. 4, 2021 in corresponding Chinese Application No. 201780091114.3 with an Engish Translation.

* cited by examiner

FIG. 4

| Class | Transmission Timing | Specific Examples |
|---|---|---|
| Short-Period Class | One-Second Period | Vehicle Information (Traveling Speed, Traveling Acceleration Rate, Traveling Direction, Steering Wheel, Accelerator, Brake, Gear Shift, Blinker); Navigation Information (Current Location); Communication Information (Wireless Throughput, Wirelessly Received Power) |
| Long-Period Class | One-Hour Period | Maintenance Information (Battery Voltage, Fuel/Oil Level, Tire Pressure); Road-Surface Information (Traveling Road Class, Traveling Lane, Dry/Wet, Undulation) |
| Event Class | At Starting of Engine or At Stopping of Engine | Maintenance Information (Fault Diagnostics Result, Traveled Distance and Cumulative Distance, Timing of Getting Periodic Inspection); Navigation Information (Traveling History, Execution/Non-Execution of S/W Updating, Driving-Unrelated User's Operations on Illumination, Air Conditioner, A/V Device, or the Like); Personal Information (Individual Driver Identification, Number of Passengers), Communication Information (Communication Log, Used Volume and Charge of Communication) |
| Condition-Change Class | At Change of Contents | Vehicle Information (Temps. inside and outside Vehicle, Open or Closed State of Door/Window); Navigation Information (Traveling Route, Departure Place, Through Place, Destination); Driver Information (Body Temp., Blood Pressure, Heart Rate, Visual Line, Facial Color, Fatigue Degree, Tension Level, Degree of Relaxing); Road Information (Jam Condition, Intersection Condition, Lane Congested Condition, Traffic Light Condition, Railroad Crossing Condition, Weather Condition) |
| Emergency Occurrence Class | At Occurrence of Accident or At Occurrence of Failure | Sensor Information (Image Information inside and around Vehicle Using Cameras inside and outside Vehicle, Phonetic Information on Speech or Reproduced Music inside Vehicle, or Sound Volume thereof, or the Like, Using Mounted Microphone); Driver information of Condition-Change Class (Additionally with Continuous Driving Time); Vehicle Information, Navigation Information, and Communication Information of Short-Period Class |

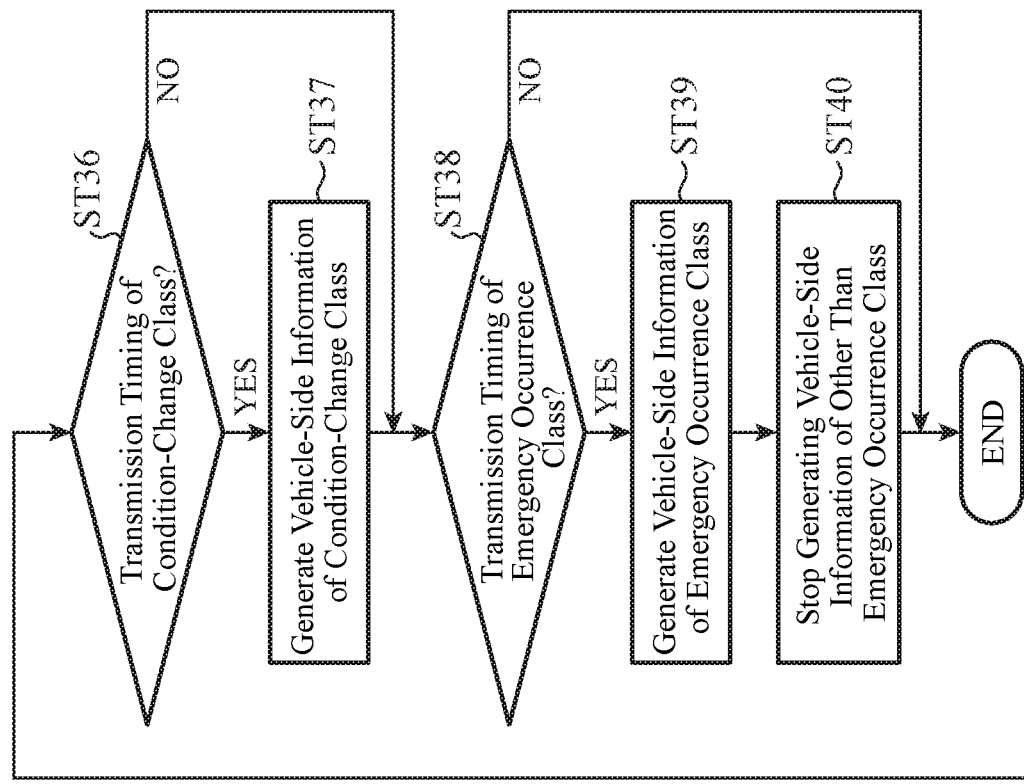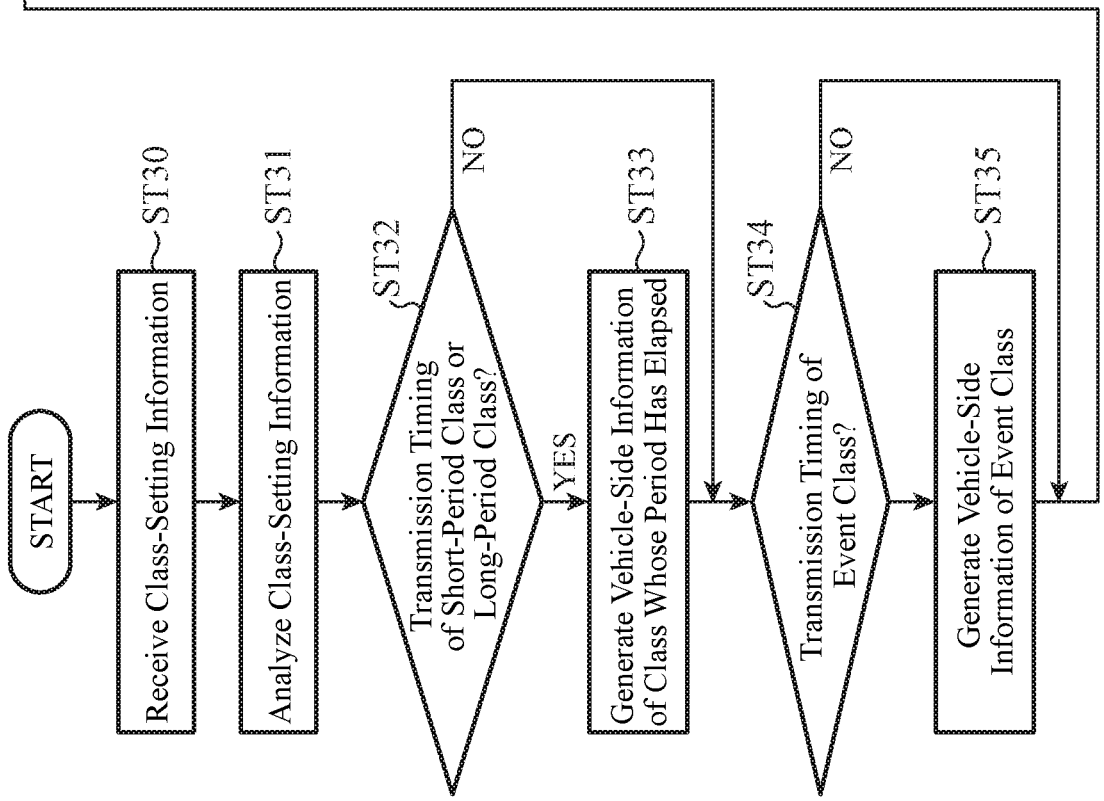
FIG. 8

IN-VEHICLE INFORMATION DEVICE, VEHICULAR SERVER, SERVER SYSTEM, AND INFORMATION TRANSMISSION METHOD FOR IN-VEHICLE INFORMATION DEVICE

TECHNICAL FIELD

The present invention relates to an in-vehicle information device for transmitting vehicle-side information collected in a host vehicle to a vehicular server.

BACKGROUND ART

It is promising to provide a drive recorder service, an automated driving service, etc. by receiving, through a network from a vehicle having a function of an Information and Communication Technology (ICT) terminal, i.e., a connected car, various pieces of data on conditions of that vehicle, road conditions therearound, and the like, and then accumulating and analyzing the pieces of data. The network is, for example, a wireless communication network using a mobile telephone network. Although increasing the speed of and enlarging the capacity of the wireless communication are being progressed, due to an increase in the number of connected cars, a frequency of communication from the vehicles and a required communication capacity will increase for a server providing the service. Accordingly, particular consideration has to be given to uplink communication directed from the vehicle toward the server.

For example, in Patent Literature 1, a method of requiring a wireless frequency resource for transmitting data on uplink in a mobile communication system is described.

CITATION LIST

Patent Literature

Patent Literature 1: Japanese Patent Publication No. 5279929

SUMMARY OF INVENTION

Technical Problem

In the various pieces of data to be transmitted by the vehicle in uplink communication to the server, there are data in common between multiple vehicles and data not in common between the multiple vehicles. The former is exemplified by information on a traffic jam condition or the like, and the latter is exemplified by information on a current location or the like. However, heretofore, information is transmitted from the vehicle to the server without differentiation between the pieces of data to be transmitted by the vehicle to the server, the differentiation being based on such a property of being common or not between the multiple vehicles. Accordingly, as one among uplink wireless frequency resources, an uplink wireless frequency resource for transmitting common information is required for each vehicle, and thus, efficient use of the uplink wireless frequency resources has not been achieved.

This invention has been made to solve the problem described above, and an object thereof is to provide an in-vehicle information device which can prevent wasteful use of uplink wireless frequency resources due to duplicative transmission of common information from every vehicle to a server, to thereby efficiently use the uplink wireless frequency resources.

Solution to Problem

An in-vehicle information device according to the invention is characterized by comprising: a transmitter to individually transmitting transmit to a vehicular server, one or multiple pieces of vehicle-side information collected in a host vehicle, at a timing corresponding to a class of transmission timing set for each of the pieces of vehicle-side information; and processing circuitry to determine whether or not transmission of common information, which is a piece of the vehicle-side information in common with another vehicle, is impossible, by using a throughput that is required when the common information is transmitted, a throughput that is estimated from a communication state with the vehicular server, and a processing load of the device; wherein, when the transmission is determined to be impossible by the processing circuitry, the transmitter transmits a message indicating that the transmission of the common information is impossible, to the vehicular server.

Advantageous Effects of Invention

According to the invention, when the transmission of the common information is impossible, the message indicating that fact is transmitted to the vehicular server. Thus, it is possible to prevent wasteful use of uplink wireless frequency resources due to duplicative transmission of common information from every vehicle to the server, to thereby efficiently use the uplink wireless frequency resources.

BRIEF DESCRIPTION OF DRAWINGS

FIG. 4 is a table showing an example of how to classify vehicle-side information in terms of transmission timing.

FIG. 8 is a flowchart showing processing by the in-vehicle information device according to Embodiment 1.

DESCRIPTION OF EMBODIMENTS

Hereinafter, for explaining the invention in more detail, an embodiment for carrying out the invention will be described with reference to the accompanying drawings.

Embodiment 1

Figure 1:
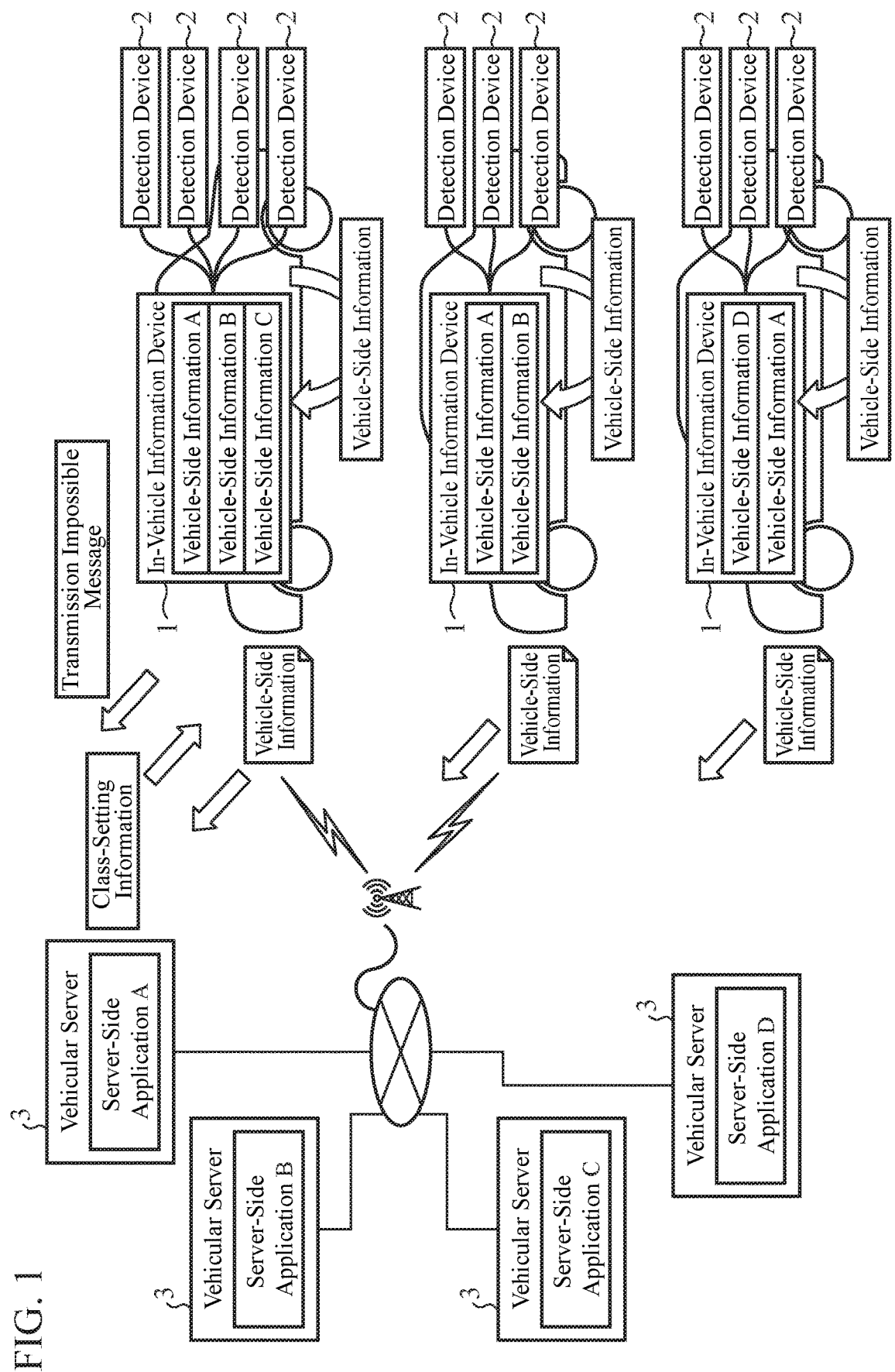
FIG. 1 is a configuration diagram of a server system including an in-vehicle information device according to Embodiment 1.

FIG. 1 is a configuration diagram of a server system including an in-vehicle information device 1 according to Embodiment 1. The server system includes in-vehicle information devices 1, detection devices 2, vehicular servers 3, and the like. One or more in-vehicle information devices 1 and one or more detection devices 2 are provided in each of multiple vehicles. In FIG. 1, three vehicles are shown in which the in-vehicle information devices 1 and the detection devices 2 are provided. The vehicular servers 3 are one or more servers outside the vehicles, the servers being provided at locations other than those of the vehicles. The in-vehicle information device 1 and the detection device 2 provided in each of the vehicles can communicate with each other by way of a local communication network in the vehicle, for example, a Controller Area Network (CAN). In-vehicle information devices 1 and vehicular servers 3 can communicate with each other by way of wireless communication that uses a mobile telephone network or the like.

The in-vehicle information device 1 transmits vehicle-side information transmitted by the detection device 2, to the vehicular server 3. The in-vehicle information device 1 is, for example, a navigation device or telematics device that performs communication with objects outside the vehicle by using the mobile telephone network. The vehicle-side information is, for example, information indicating a traveling speed, a traffic jam condition, or the like. Detailed specific examples of the vehicle-side information will be described later using FIG. 4. At the time of transmitting the vehicle-side information to the vehicular server 3, the in-vehicle information device 1 uses class-setting information that is received from the vehicular server 3, to thereby transmit the vehicle-side information at a timing that is set as a transmission timing therefor. The class-setting information is information indicating classification of vehicle-side information in terms of transmission timing.

Further, when the transmission of common information is impossible, the in-vehicle information device 1 transmits a transmission impossible message indicating that fact to the vehicular server 3. The common information is vehicle-side information which is in common with another vehicle.

In the in-vehicle information device 1, applications are installed. The applications are to provide services to the vehicle. For example, in one of the three vehicles shown in FIG. 1, a vehicle-side application A, a vehicle-side application B, and a vehicle-side application C are installed; in another one of the vehicles, the vehicle-side application A and the vehicle-side application B are installed; and in still another one of the vehicles, the vehicle-side application A and a vehicle-side application D are installed.

The detection device 2 transmits the vehicle-side information to the in-vehicle information device 1 of the vehicle. Using a variety of sensors, cameras, and the like, the detection device 2 detects a traveling speed, a traffic jam condition, or the like, and then generates the vehicle-side information using the detection result.

The vehicular server 3 transmits the class-setting information indicating the classification of vehicle-side information in terms of transmission timing, to the in-vehicle information device 1. In FIG. 1, four vehicular servers 3 are provided, and each of the four vehicular servers 3 transmits the class-setting information. In each of the vehicular servers 3, an application for providing a service is installed. For example, in FIG. 1, there are shown the vehicular server 3 in which a server-side application A is installed; the vehicular server 3 in which a server-side application B is installed; the vehicular server 3 in which a server-side application C is installed; and the vehicular server 3 in which a server-side application D is installed.

The server-side application A corresponds to the vehicle-side application A, and a service using the vehicle-side information is provided by the server-side application A and the vehicle-side application A cooperating with each other. The same applies to the server-side applications B to D.

The service is exemplified by a drive recorder service, an automated driving service, a fault diagnostics service, or the like, and in each of these services, processing is performed using the vehicle-side information transmitted from the in-vehicle information device 1. For example, in the drive recorder service, a process of monitoring the vehicle remotely, a process of collecting the vehicle-side information as a log, a process of collecting the vehicle-side information that may be evidence at the occurrence of a traffic accident, and the like, are performed.

It is noted that, in FIG. 1, three vehicles are illustrated as the vehicles in which the in-vehicle information devices 1 are provided; however, the number of the vehicles that communicate with the vehicular servers 3 is not limited thereto. Likewise, the number of the vehicular servers 3 is not limited to four as shown in FIG. 1. Further, in FIG. 1, a case is shown where one vehicular server 3 is provided for each server-side application, namely, for each service; however, multiple different server-side applications may be installed in one vehicular server 3, so that this one vehicular server 3 provides multiple different services.

Figure 2:
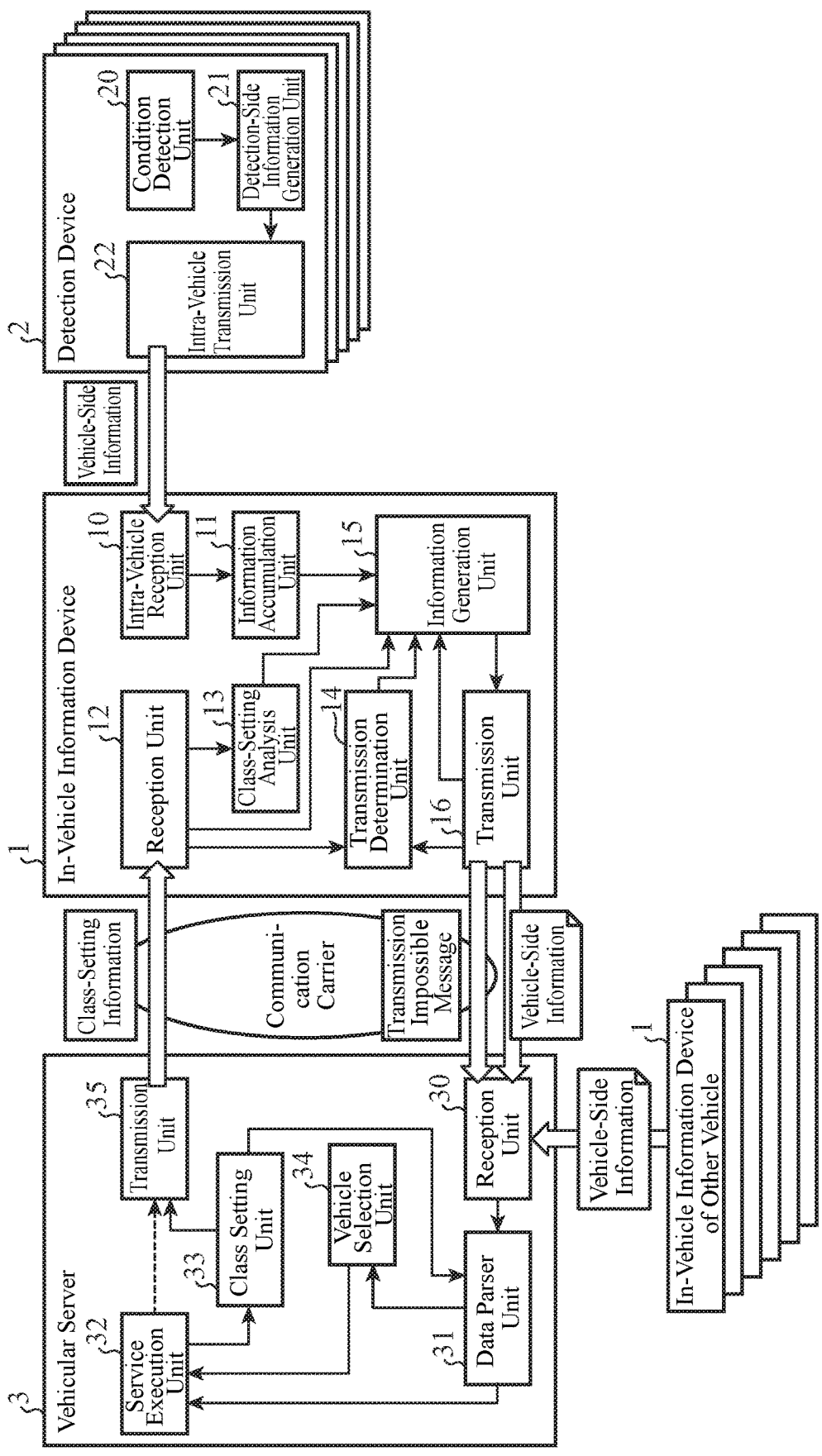
FIG. 2 is a block diagram showing internal configuration examples of the in-vehicle information device, a detection device, and a vehicular server, according to Embodiment 1.

FIG. 2 is a block diagram showing internal configuration examples of the in-vehicle information device 1, the detection device 2, and the vehicular server 3. In FIG. 2, the in-vehicle information device 1 and the detection device 2 provided only in one vehicle are shown in detail, so that illustrations of the in-vehicle information devices 1 and the detection devices 2 provided in the other vehicles are simplified or omitted.

The detection device 2 includes a condition detection unit 20, a detection-side information generation unit 21, and an intra-vehicle transmission unit 22.

The condition detection unit 20 corresponds to the variety of sensors, the cameras, and the like. The condition detection unit 20 detects conditions of the vehicle, the user of the vehicle, the environment around the vehicle, and the like, and outputs the detection result to the detection-side information generation unit 21.

The detection-side information generation unit 21 generates the vehicle-side information using the detection result.

The intra-vehicle transmission unit 22 transmits the vehicle-side information generated by the detection-side information generation unit 21 to the in-vehicle information device 1.

The in-vehicle information device 1 includes an intra-vehicle reception unit 10, an information accumulation unit 11, a reception unit 12, a class-setting analysis unit 13, a transmission determination unit 14, an information generation unit 15, and a transmission unit 16.

The intra-vehicle reception unit 10 serves to make communication with the detection device 2, and receives the vehicle-side information from the detection device 2. The intra-vehicle reception unit 10 outputs the received vehicle-side information to the information accumulation unit 11.

The information accumulation unit 11 accumulates the vehicle-side information outputted by the intra-vehicle reception unit 10 in an unshown storage unit. Further, the information accumulation unit 11 discards the vehicle-side information accumulated in the storage unit, in accordance with processing circumstances.

The reception unit 12 serves to make communication with the vehicular server 3, and receives from the vehicular server 3, a variety of pieces of information, such as the class-setting information and the like. The reception unit 12 outputs the received class-setting information to the class-setting analysis unit 13. Further, the reception unit 12 outputs first radio information that is information related to the wireless communication between the in-vehicle information device 1 and the vehicular server 3, to the transmission determination unit 14 and the information generation unit 15. The first radio information is information indicating radio-field intensity or the like detected by the reception unit 12, and is generated by the reception unit 12.

The class-setting analysis unit 13 analyzes the class-setting information outputted by the reception unit 12, and performs format conversion or the like on the class-setting information so that it becomes usable in the information generation unit 15, and then outputs it to the information generation unit 15.

The transmission determination unit 14 determines whether or not the transmission of the common information is impossible. As already described, the common information is the vehicle-side information which is in common with another vehicle. The transmission determination unit 14 outputs the determination result to the information generation unit 15. Note that details of the determination by the transmission determination unit 14 will be described later.

The information generation unit 15 acquires through the information accumulation unit 11, the vehicle-side information accumulated in the unshown storage unit by the information accumulation unit 11 and generates vehicle-side information in a form in which information on the host vehicle such as vehicle-identification information, a vehicle class, etc. is additionally incorporated in the acquired vehicle-side information, and then outputs it to the transmission unit 16. At that time, the information generation unit 15 performs processing using the class-setting information outputted by the class-setting analysis unit 13 and second radio information outputted by the transmission unit 16. The second radio information is information that the transmission unit 16 has received from a wireless base station, the second radio information indicating a coding scheme and the like. The wireless base station relays communication between the in-vehicle information device 1 and the vehicular server 3. Namely, the information generation unit 15 generates vehicle-side information while adjusting the data volume thereof by using the second radio information, and the information generation unit 15 outputs the thus-generated vehicle-side information to the transmission unit 16 in accordance with the transmission timing indicated in the class-setting information. The vehicle-identification information is, for example, information indicating the plate number of the host vehicle, and the vehicle class is, for example, information indicating a large vehicle or a small vehicle and information indicating a vehicle type or the like. Incorporation of such information in the vehicle-side information by the information generation unit 15 makes it possible for the vehicular server 3, etc. that use the vehicle-side information, to identify the vehicle corresponding to the vehicle-side information.

Further, when the determination result outputted by the transmission determination unit 14 indicates that the transmission is impossible, the information generation unit 15 generates a transmission impossible message indicating the fact that the transmission of the common information is impossible, and outputs it to the transmission unit 16.

The functions of the information generation unit 15 are controlled by the vehicle-side applications.

The transmission unit 16 serves to make communication with the vehicular server 3, and each time the information generation unit 15 outputs the vehicle-side information or the transmission impossible message, the transmission unit 16 transmits it to the vehicular server 3. Accordingly, each piece of the vehicle-side information is transmitted to the vehicular server 3 at a timing corresponding to the class of transmission timing individually set in the class-setting information. Further, the transmission unit 16 outputs the second radio information received from the wireless base station, to the transmission determination unit 14 and the information generation unit 15.

The vehicular server 3 includes a reception unit 30, a data parser unit 31, a service execution unit 32, a class setting unit 33, a vehicle selection unit 34, and a transmission unit 35.

The reception unit 30 serves to make communication with the in-vehicle information device 1, and receives the vehicle-side information, the transmission impossible message, etc. transmitted by the in-vehicle information device 1. The reception unit 30 outputs the vehicle-side information, the transmission impossible message, etc. to the data parser unit 31.

The data parser unit 31 determines where to output a variety of pieces of information received by the reception unit 30 from the in-vehicle information device 1, and distributes the pieces of information to suitable components. For example, the data parser unit 31 outputs all pieces of vehicle-side information outputted by the reception unit 30, to the service execution unit 32. In contrast, the data parser unit 31 outputs only pieces of vehicle-side information about a current location, a traveling speed, and the like among the pieces of vehicle-side information outputted by the reception unit 30, to the vehicle selection unit 34. Further, for example, the data parser unit 31 outputs the transmission impossible message outputted by the reception unit 30, only to the vehicle selection unit 34.

The service execution unit 32 executes the service by using the vehicle-side information outputted by the data parser unit 31. For example, in the case of the drive recorder service, the service execution unit 32 determines whether or not the vehicle is in an abnormal driving condition, whether or not the driver is in an abnormal condition, whether or not a vehicle part or vehicle device fails, and a fact something like that. The result of execution by the service execution unit 32 is, where appropriate, transmitted through the transmission unit 35 to the corresponding vehicle. The functions of the service execution unit 32 are controlled by the server-side application.

In addition, the service execution unit 32 outputs to the class setting unit 33, request information indicating what vehicle-side information and at what timing the vehicle-side information should be transmitted to the vehicular server 3, for the execution of the service.

Using the request information outputted by the service execution unit 32, the class setting unit 33 sets the classification of vehicle-side information in terms of transmission timing. The class setting unit 33 outputs the class-setting information in which contents of the thus-set classification are indicated, to the transmission unit 35 and the data parser unit 31.

The vehicle selection unit 34 selects from among the multiple vehicles, a target vehicle which is to be caused to transmit the common information. Note that details of such selection by the vehicle selection unit 34 will be described later. The vehicle selection unit 34 outputs information indicating which vehicle has been selected as the target vehicle, to the service execution unit 32. Accordingly, in addition to generating the request information to be outputted to the class setting unit 33, the service execution unit 32 can recognize which vehicle the vehicle-side information including the common information corresponds to.

The transmission unit 35 serves to make communication with the in-vehicle information device 1, and transmits a variety of pieces of information, such as the class-setting information outputted by the class setting unit 33 and the like, to the in-vehicle information device 1.

Next, hardware configuration examples of the in-vehicle information device 1 will be described using FIG. 3A and FIG. 3B.

The functions of the information accumulation unit 11, the class-setting analysis unit 13, the transmission determination unit 14, and the information generation unit 15 in the in-vehicle information device 1 are implemented by a processing circuit. The processing circuit may be dedicated hardware, and may be a Central Processing Unit (CPU) which executes a program stored in a memory. The CPU is also called as a central processing device, a processing device, an arithmetic device, a microprocessor, a microcomputer, a processor, or a Digital Signal Processor (DSP). Further, the intra-vehicle reception unit 10 of the in-vehicle information device 1 is implemented by an intra-vehicle communication device 104, and the reception unit 12 and the transmission unit 16 are implemented by a communication device 105. The intra-vehicle communication device 104 is, for example, a CAN. Further, the communication device 105 is a wireless communication device that is compatible with Long Term Evolution (LTE) or the like.

Figure 3A:
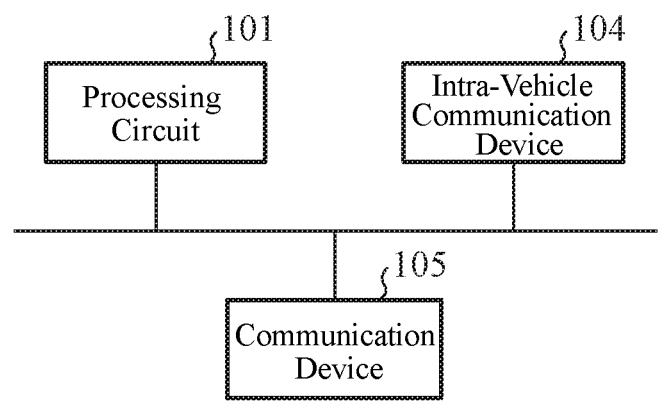
FIG. 3A and FIG. 3B are diagrams each showing a hardware configuration example of the in-vehicle information device according to Embodiment 1.

FIG. 3A is a diagram showing a hardware configuration example in the case where the functions of the information accumulation unit 11, the class-setting analysis unit 13, the transmission determination unit 14, and the information generation unit 15 are implemented by a processing circuit 101 that is the dedicated hardware. The processing circuit 101 is, for example, a single circuit, a composite circuit, a programmed processor, a parallel-programmed processor, an Application Specific Integrated Circuit (ASIC), a Field Programmable Gate Array (FPGA), or any combination thereof. The functions of the information accumulation unit 11, the class-setting analysis unit 13, the transmission determination unit 14, and the information generation unit 15 may be implemented by separate processing circuits 101 in combination, and the functions of the respective units may be implemented by one processing circuit 101.

Figure 3B:
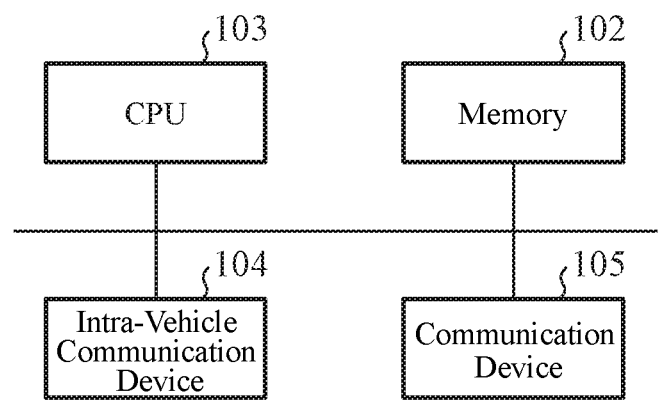

FIG. 3B is a diagram showing a hardware configuration example in the case where the functions of the information accumulation unit 11, the class-setting analysis unit 13, the transmission determination unit 14, and the information generation unit 15 are implemented by a CPU 103 which executes a program stored in a memory 102. In this case, the functions of the information accumulation unit 11, the class-setting analysis unit 13, the transmission determination unit 14, and the information generation unit 15 are implemented by software, firmware, or a combination of software and firmware. The software and firmware are each written as a program and stored in the memory 102. The CPU 103 reads out and executes the program stored in the memory 102, to thereby implement the functions of the information accumulation unit 11, the class-setting analysis unit 13, the transmission determination unit 14, and the information generation unit 15. Namely, the in-vehicle information device 1 has the memory 102 for storing the program and the like by which processing in the steps shown in the flowcharts of FIG. 6, FIG. 8, and FIG. 9 to be described later, will be finally executed. Further, these programs can be said to be programs for causing a computer to execute steps or processes of the information accumulation unit 11, the class-setting analysis unit 13, the transmission determination unit 14, and the information generation unit 15. Here, the memory 102 is, for example, a non-volatile or volatile semiconductor memory, such as a Random Access Memory (RAM), a Read Only Memory (ROM), a flash memory, an Erasable Programmable ROM (EPROM), and an Electrically Erasable Programmable ROM (EEPROM), or a disc-like storage medium, such as a magnetic disc, a flexible disc, an optical disc, a compact disc, a mini disc, and a Digital Versatile Disc (DVD).

It is noted that the functions of the information accumulation unit 11, the class-setting analysis unit 13, the transmission determination unit 14, and the information generation unit 15 may be implemented partly by dedicated hardware and partly by software or firmware. For example, it is allowable that, with respect to the information accumulation unit 11 and the class-setting analysis unit 13, their functions may be implemented by a processing circuit as dedicated hardware, while, with respect to the transmission determination unit 14 and the information generation unit 15, their functions may be implemented in such a manner that a processing circuit reads out and executes a program stored in a memory.

As mentioned above, using hardware, software, firmware, or a combination thereof, the processing circuit can implement the functions of the information accumulation unit 11, the class-setting analysis unit 13, the transmission determination unit 14, and the information generation unit 15, which are mentioned above.

It is noted that the detection-side information generation unit 21 in the detection device 2 may also be implemented by the processing circuit 101 shown in FIG. 3A, or the memory 102 and the CPU 103 shown in FIG. 3B, similarly to the information accumulation unit 11, the class-setting analysis unit 13, the transmission determination unit 14, and the information generation unit 15 in the in-vehicle information device 1. Further, the intra-vehicle transmission unit 22 in the detection device 2 may be implemented by a communication device similar to the intra-vehicle communication device 104.

Further, the data parser unit 31, the service execution unit 32, the class setting unit 33, and the vehicle selection unit 34 in the vehicular server 3 may also be implemented by the processing circuit 101 shown in FIG. 3A, or the memory 102 and the CPU 103 shown in FIG. 3B, similarly to the information accumulation unit 11, the class-setting analysis unit 13, the transmission determination unit 14, and the information generation unit 15 in the in-vehicle information device 1. Further, the reception unit 30 and the transmission unit 35 in the vehicular server 3 may be implemented by a communication device similar to the communication device 105.

Next, the vehicle-side information will be described in detail. Each piece of the vehicle-side information is classified in terms of transmission timing, for example, as information to be periodically transmitted to the vehicular server 3, information to be transmitted at every time an event occurs in the vehicle, information to be transmitted at every time the contents thereof change, or information to be transmitted at the time an emergency occurs in the vehicle.

Further, each piece of the information to be periodically transmitted to the vehicular server 3 is further classified in terms of transmission timing, for example, as information to be transmitted at short intervals of one second or one minute, or information to be transmitted at long intervals of one hour or one day. Instead, each piece of the information to be periodically transmitted to the vehicular server 3 may be classified in terms of transmission timing, in accordance with a distance-based period rather than a time-based period, as short-period information to be transmitted at every time the vehicle moves one meter, or long-period information to be transmitted at every time the vehicle moves one kilometer.

In the following, description will be made using application to the drive recorder service as an example.

FIG. 4 is a table showing an example of how to classify the vehicle-side information in terms of transmission timing, in the driving recorder service.

Five classes of a short-period class, a long-period class, an event class, a condition-change class, and an emergency-occurrence class, are set.

The short-period class is a class in which the transmission timing is given every one second. What corresponds thereto includes vehicle information, navigation information, communication information, and the like, as shown in FIG. 4.

The long-period class is a class in which the transmission timing is given every one hour. What corresponds thereto includes maintenance information, road-surface information, and the like, as shown in FIG. 4.

The event class is a class in which the transmission timing is given at starting of the engine or at stopping of the engine. What corresponds thereto includes maintenance information, navigation information, personal information, communication information, and the like, as shown in FIG. 4.

The condition-change class is a class in which the transmission timing is given at the time contents of the information change. What corresponds thereto includes vehicle information, navigation information, driver information, road information, and the like, as shown in FIG. 4. The transmission timing of the navigation information is given when, for example, the vehicle user changes his/her destination to thereby cause change in the navigation information.

The emergency-occurrence class is a class in which the transmission timing is given at the occurrence of an accident or at the occurrence of a failure. As shown in FIG. 4, what corresponds thereto includes the following: sensor information; driver information similar to that corresponding to the condition-change class, but including a continuous driving time; vehicle information, navigation information, and communication information similar to those corresponding to the short-period class; and the like.

In the example shown in FIG. 4, the road-surface information of the long-period class and the road information of the condition-change class are each provided as common information in common with another vehicle. Namely, the road-surface information of the long-period class is the same or almost the same and the road information of the condition-change class is the same or almost the same between vehicles which are not so far from each other. It is noted that an intersection condition in the road information of the condition-change class means, for example, how congested an intersection is due to right turn-waiting vehicles or the like. From the vehicular server 3, the in-vehicle information device 1 is pre-notified of which pieces of vehicle-side information correspond to the common information.

It is noted that the classification in terms of transmission timing is set independently for each of the services in various manners. Namely, when the vehicle receives multiple services, a case may arise where the vehicle information such as a traveling speed or the like, assigned to the short-period class in FIG. 4, is assigned to the long-period class in another service, for example, the fault diagnostics service.

Next, processing by the in-vehicle information device 1, the detection device 2, and the vehicular server 3 that are configured in the above manner, will be described using flowcharts shown in FIG. 5 to FIG. 10.

Figure 5:
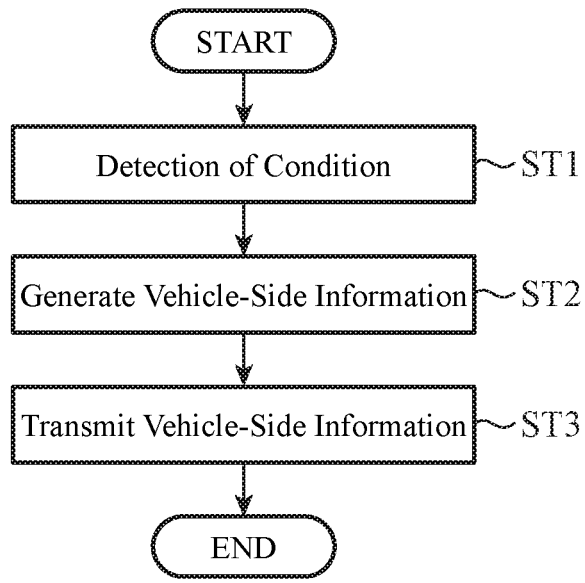
FIG. 5 is a flowchart showing processing by the detection device.

FIG. 5 is a flowchart showing processing at the time the detection device 2 transmits the vehicle-side information to the in-vehicle information device 1. The processing shown in FIG. 5 is performed repeatedly after the engine of the vehicle is activated.

The condition detection unit 20 detects various conditions related to the vehicle, the user of the vehicle, the environment around the vehicle, and the like, as shown in FIG. 4, and outputs the detection result to the detection-side information generation unit 21 (Step ST1).

Subsequently, the detection-side information generation unit 21 generates the vehicle-side information by using the detection result outputted by the condition detection unit 20 (Step ST2). At this time, the detection-side information generation unit 21 generates the vehicle-side information in a form in which clock-time information is added to the detection result, and outputs it to the intra-vehicle transmission unit 22.

Subsequently, the intra-vehicle transmission unit 22 transmits the vehicle-side information generated by the detection-side information generation unit 21 to the in-vehicle information device 1 (Step ST3).

Figure 6:
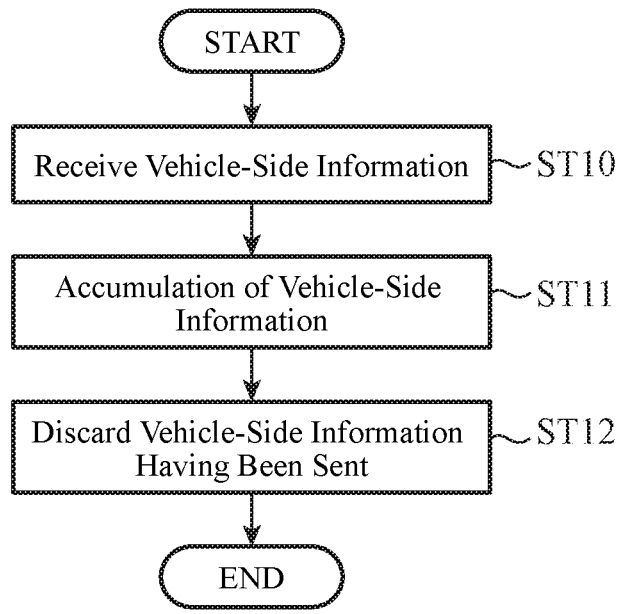
FIG. 6 is a flowchart showing processing by the in-vehicle information device according to Embodiment 1.

FIG. 6 is a flowchart showing processing at the time the in-vehicle information device 1 receives and manages the vehicle-side information transmitted by the detection device 2. The processing shown in FIG. 6 is performed repeatedly after the detection device 2 begins to transmit the vehicle-side information.

The intra-vehicle reception unit 10 receives the vehicle-side information from the detection device 2 (Step ST10).

Subsequently, the intra-vehicle reception unit 10 outputs the received vehicle-side information to the information accumulation unit 11, and the information accumulation unit 11 accumulates the vehicle-side information by storing it in the unshown storage unit (Step ST11).

Thereafter, when the information accumulation unit 11 has sent the vehicle-side information stored in the unshown storage unit to the information generation unit 15, the information accumulation unit 11 discards the thus-sent vehicle-side information by erasing it from the storage unit (Step ST12).

Figure 7:
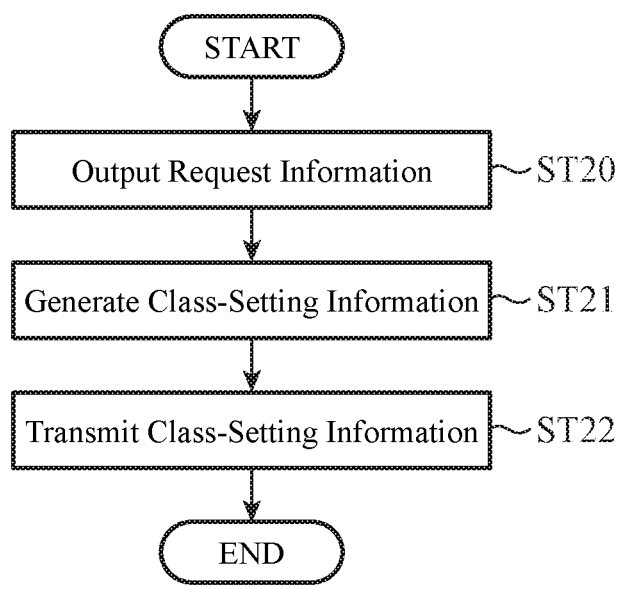
FIG. 7 is a flowchart showing processing by the vehicular server according to Embodiment 1.

FIG. 7 is a flowchart showing processing at the time the vehicular server 3 transmits the class-setting information to the in-vehicle information device 1. For example, the processing shown in FIG. 7 is performed when, in order to receive a service, the in-vehicle information device 1 makes first communication or the like, with the vehicular server 3 for providing that service.

The service execution unit 32 outputs to the class setting unit 33, the request information indicating what vehicle-side information and at what timing the vehicle-side information should be transmitted to the vehicular server 3, for the execution of the service (Step ST20).

Subsequently, using the request information outputted by the service execution unit 32, the class setting unit 33 generates the class-setting information (Step ST21). It is noted that, at this time, the class setting unit 33 makes the class-setting information contain, information for specifying data volume of each piece of the vehicle-side information, pilot data that enables identification of a service and is to be inserted at the head of the vehicle-side information, or the like. The class setting unit 33 outputs the generated class-setting information to the transmission unit 35.

Subsequently, the transmission unit 35 transmits the class-setting information outputted by the class setting unit 33 to the in-vehicle information device 1 (Step ST22).

FIG. 8 is a flowchart showing processing at the time the in-vehicle information device 1 transmits the vehicle-side information collected on the vehicle side to the vehicular server 3, by using the class-setting information transmitted by the vehicular server 3.

The reception unit 12 receives the class-setting information transmitted by the vehicular server 3 (Step ST30). The reception unit 12 outputs the received class-setting information to the class-setting analysis unit 13.

Subsequently, the class-setting analysis unit 13 analyzes the class-setting information outputted by the reception unit 12 (Step ST31). After analyzing the class-setting information, the class-setting analysis unit 13 performs format conversion or the like on the class-setting information so that it becomes usable in the information generation unit 15, and then outputs it to the information generation unit 15.

Subsequently, the information generation unit 15 determines whether or not now is a transmission timing of the short-period class or the long-period class (Step ST32). At this time, the information generation unit 15 performs such determination on the basis of whether or not the period of the short-period class has elapsed from the latest generation of the vehicle-side information of the short-period class, and whether or not the period of the long-period class has elapsed from the latest generation of the vehicle-side information of the long-period class.

When neither of the period of the short-period class and the period of the long-period class has elapsed (Step ST32; NO), the information generation unit 15 performs processing in Step ST34 to be described later.

In contrast, when the period of the short-period class or the period of the long-period class has elapsed (Step ST32; YES), the information generation unit 15 generates the vehicle-side information of the class the period of which has elapsed (Step ST33). The vehicle-side information generated by the information generation unit 15 is transmitted through the transmission unit 16 to the vehicular server 3. Note that the vehicle-side information generated by the information generation unit 15 is vehicle-side information in a form in which the information on the vehicle such as vehicle-identification information, a vehicle class, etc. is additionally incorporated in the vehicle-side information provided with clock time information and accumulated by the information accumulation unit 11 in the unshown storage unit.

Subsequently, the information generation unit 15 determines whether or not now is a transmission timing of the event class, namely, whether or not an event such as starting of the engine, stopping of the engine, or the like has occurred (Step ST34).

When no event has occurred (Step ST34; NO), the information generation unit 15 performs processing in Step ST36 to be described later.

In contrast, when the event has occurred (Step ST34; YES), the information generation unit 15 generates the vehicle-side information of the event class (Step ST35). The vehicle-side information generated by the information generation unit 15 is transmitted through the transmission unit 16 to the vehicular server 3. As described previously, the vehicle-side information generated by the information generation unit 15 is vehicle-side information in a form in which the clock time information and the information on the vehicle such as vehicle-identification information, a vehicle class, etc. are incorporated.

Subsequently, the information generation unit 15 determines whether or not now is a transmission timing of the condition-change class, namely, whether or not there is vehicle-side information that corresponds to the vehicle-side information of the condition-change class and whose contents have changed (Step ST36).

When there is no such vehicle-side information whose contents have changed (Step ST36; NO), the information generation unit 15 performs processing in Step ST38 to be described later.

In contrast, when there is such vehicle-side information whose contents have changed (Step ST36; YES), the information generation unit 15 changes that vehicle-side information into a form in which the clock time information and the information on the vehicle such as vehicle-identification information, a vehicle class, etc. are incorporated, to thereby generate the vehicle-side information to be transmitted to the vehicular server 3 (Step ST37). The vehicle-side information generated by the information generation unit 15 is transmitted through the transmission unit 16 to the vehicular server 3.

Subsequently, the information generation unit 15 determines whether or not now is a transmission timing of the emergency-occurrence class, namely, whether or not an accident or a failure has occurred (Step ST38).

When neither an accident nor a failure has occurred (Step ST38; NO), the information generation unit 15 terminates the processing for one loop, and thereafter, at an appropriate timing, initiates again the processing from Step ST32.

In contrast, when an accident or a failure has occurred (Step ST38; YES), the information generation unit 15 generates the vehicle-side information of the emergency-occurrence class (Step ST39). The vehicle-side information generated by the information generation unit 15 is transmitted through the transmission unit 16 to the vehicular server 3. As described previously, the vehicle-side information generated by the information generation unit 15 is vehicle-side information in a form in which the clock time information and the information on the vehicle such as vehicle-identification information, a vehicle class, etc. are incorporated.

Thereafter, the information generation unit 15 stops generating the vehicle-side information other than that of the emergency-occurrence class (Step ST40).

It is noted that, although the description has been made citing the drive recorder service as an example, when the vehicle receives a different service in addition to the drive recorder service, a case may arise where a short-period class having one-second period is also set in the different service. In this case, the information generation unit 15 outputs the vehicle-side information of the short-period class for the drive recorder service and the vehicle-side information of the short-period class for the different service, in their joined state, to the transmission unit 16, and then the transmission unit 16 transmits these pieces of vehicle-side information in the joined state. When the information generation unit 15 conjoins these pieces of vehicle-side information for the services different from each other, in such a manner that the pilot data for identification of a service, etc. included in the class-setting information are inserted appropriately in them, the data parser unit 31 in the vehicular server 3 can extract only the vehicle-side information for the service provided by its vehicular server 3.

Further, the information generation unit 15 may generate the vehicle-side information in which the vehicle-identification information, etc. of the vehicle are incorporated, after subjecting the vehicle-side information accumulated by the information accumulation unit 11 in the unshown storage unit, to primary processing. For example, a fault-diagnostics result as maintenance information of the event class in FIG. 4 is accumulated in the unshown storage unit, as vehicle-side information in which whether a failure is present or not is shown for each of in-vehicle devices. As the primary processing, the information generation unit 15 performs remaking the accumulated vehicle-side information into vehicle-side information indicating that there is no failure in all of the in-vehicle devices or indicating that there is any failed in-vehicle device. Then, as secondary processing, the information generation unit 15 performs incorporating the vehicle-identification information, etc. of the vehicle, into the vehicle-side information generated by the primary processing.

Figure 9:
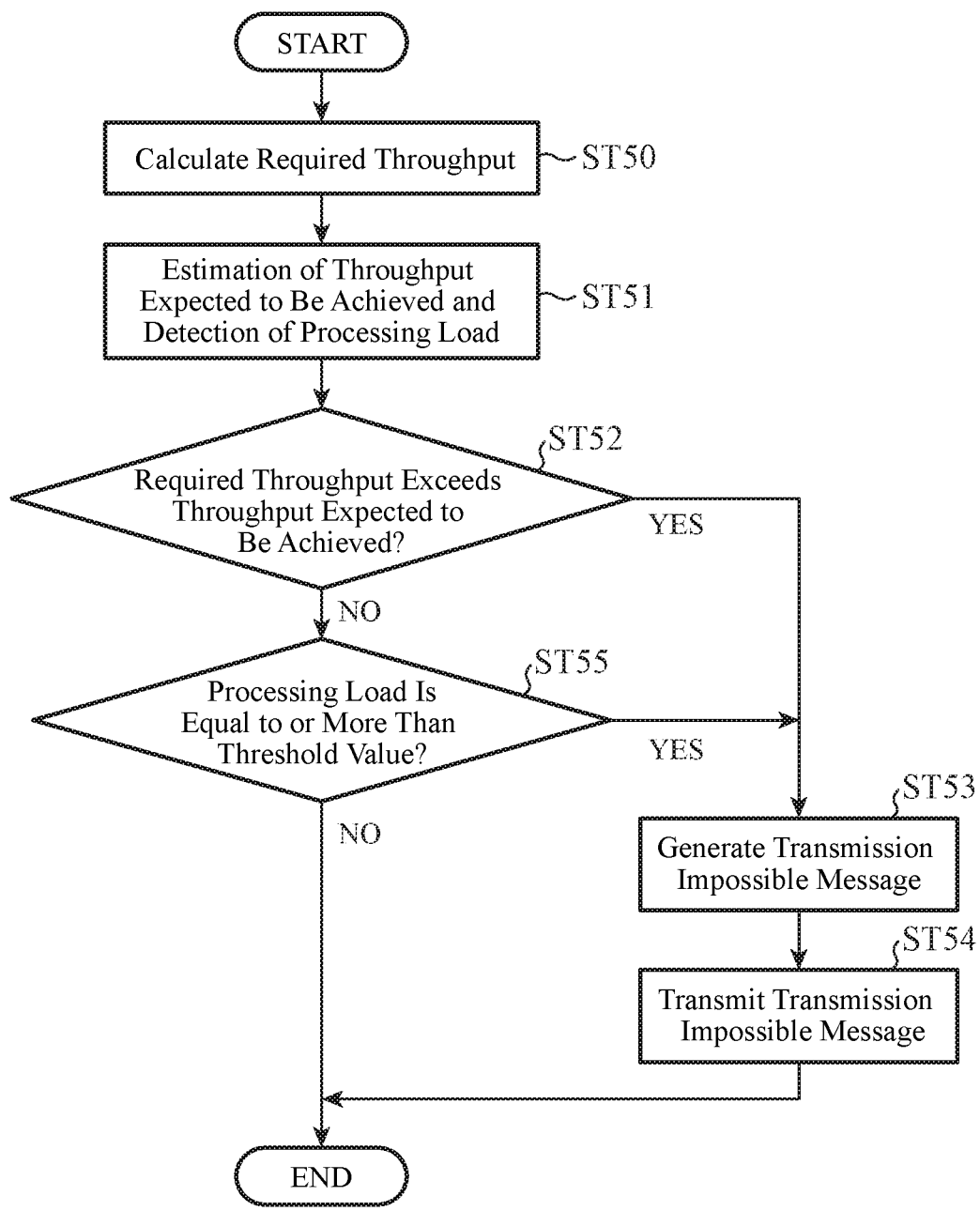
FIG. 9 is a flowchart showing processing by the in-vehicle information device according to Embodiment 1.

FIG. 9 is a flowchart showing processing at the time the in-vehicle information device 1 determines whether or not the transmission of the common information is impossible. The processing shown in FIG. 9 is performed at appropriate timings when the in-vehicle information device 1 has received the class-setting information from the vehicular server 3. For example, the processing shown in FIG. 9 is performed when the vehicle enters a new area across the boundary between areas shown in FIG. 11 to be described later.

The transmission determination unit 14 calculates a throughput that is required when the common information is transmitted together with other vehicle-side information (Step ST50). This other vehicle-side information at this time is vehicle-side information that is different to the common information, i.e. vehicle-side information not in common with another vehicle. For example, in the example shown in FIG. 4, the road-surface information of the long-period class is common information. Usually, at the time the in-vehicle information device 1 transmits the vehicle-side information of the long-period class to the vehicular server 3, no road-surface information is included therein. When the road-surface information is cited as an example, in Step ST50, the transmission determination unit 14 determines how much data volume, the vehicle-side information of the long-period class including the road-surface information has, to thereby calculate the required throughput. For example, a rough estimate of data volume of each piece of the vehicle-side information is prestored in the unshown storage unit in the in-vehicle information device 1.

Subsequently, the transmission determination unit 14 estimates a throughput that is expected to be achieved at the time information is transmitted to the vehicular server 3, and further detects the processing load of the in-vehicle information device 1 (Step ST51). At this time, the transmission determination unit 14 estimates the throughput by using the first radio information outputted by the reception unit 12 and the second radio information outputted by the transmission unit 16. In the second radio information, there is shown as information indicating a communication state, a coding scheme to be used at the transmission from the transmission unit 16, namely, a theoretical value of throughput corresponding to an uplink wireless frequency resource to be assigned, the coding scheme being specified by the wireless base station relaying communication between the in-vehicle information device 1 and the vehicular server 3. In the first radio information, there is shown radio-field intensity or the like indicating a communication state. In a weak electric-field region, an actual throughput may possibly be lower than the theoretical value. For this reason, the transmission determination unit 14 estimates the throughput expected to be achieved, by using the first radio information in addition to the second radio information.

Further, the transmission determination unit 14 detects as the processing load of the in-vehicle information device 1, a CPU utilization of the in-vehicle information device 1, for example.

Subsequently, the transmission determination unit 14 determines whether or not the required throughput calculated in Step ST50 exceeds the throughput expected to be achieved, which is estimated in Step ST51 (Step ST52).

When the required throughput exceeds the throughput expected to be achieved (Step ST52; YES), the transmission determination unit 14 determines that the transmission of the common information is impossible, and outputs the determination result to the information generation unit 15. Then, the information generation unit 15 generates the transmission impossible message (Step ST53). The information generation unit 15 outputs the generated transmission impossible message to the transmission unit 16. Note that the information generation unit 15 generates the transmission impossible message so that the information on the vehicle such as vehicle-identification information, a vehicle class, etc. is incorporated therein.

Subsequently, the transmission unit 16 transmits the transmission impossible message to the vehicular server 3 (Step ST54).

In contrast, when the required throughput is equal to or less than the throughput expected to be achieved (Step ST52; NO), the transmission determination unit 14 determines whether or not the processing load of the in-vehicle information device 1 detected in Step ST51 is equal to or more than a threshold value (Step ST55). For example, when the transmission determination unit 14 detects the CPU utilization of the in-vehicle information device 1 in Step ST51, the threshold value is set to a CPU utilization of about 75 percent. Note that the transmission determination unit 14 may take an average on the CPU utilization for a specified period of time, to thereby detect only a continuous CPU utilization without momentary load change.

When the processing load of the in-vehicle information device 1 is equal to or more than the threshold value (Step ST55; YES), the transmission determination unit 14 determines that the transmission of the common information is impossible, and outputs the determination result to the information generation unit 15. Then, the processing in Step ST53 by the information generation unit 15 and the processing in Step ST54 by the transmission unit 16 are performed.

In contrast, when the processing load of the in-vehicle information device 1 is less than the threshold value (Step ST55; NO), the transmission determination unit 14 determines that the transmission of the common information is possible. In this case, the transmission of the transmission impossible message by the transmission unit 16 is not performed.

Figure 10:
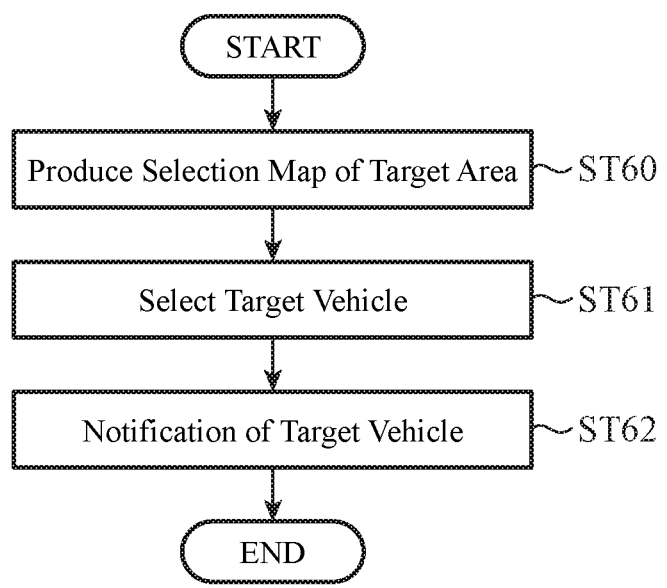
FIG. 10 is a flowchart showing processing by the vehicular server according to Embodiment 1.
Figure 11:
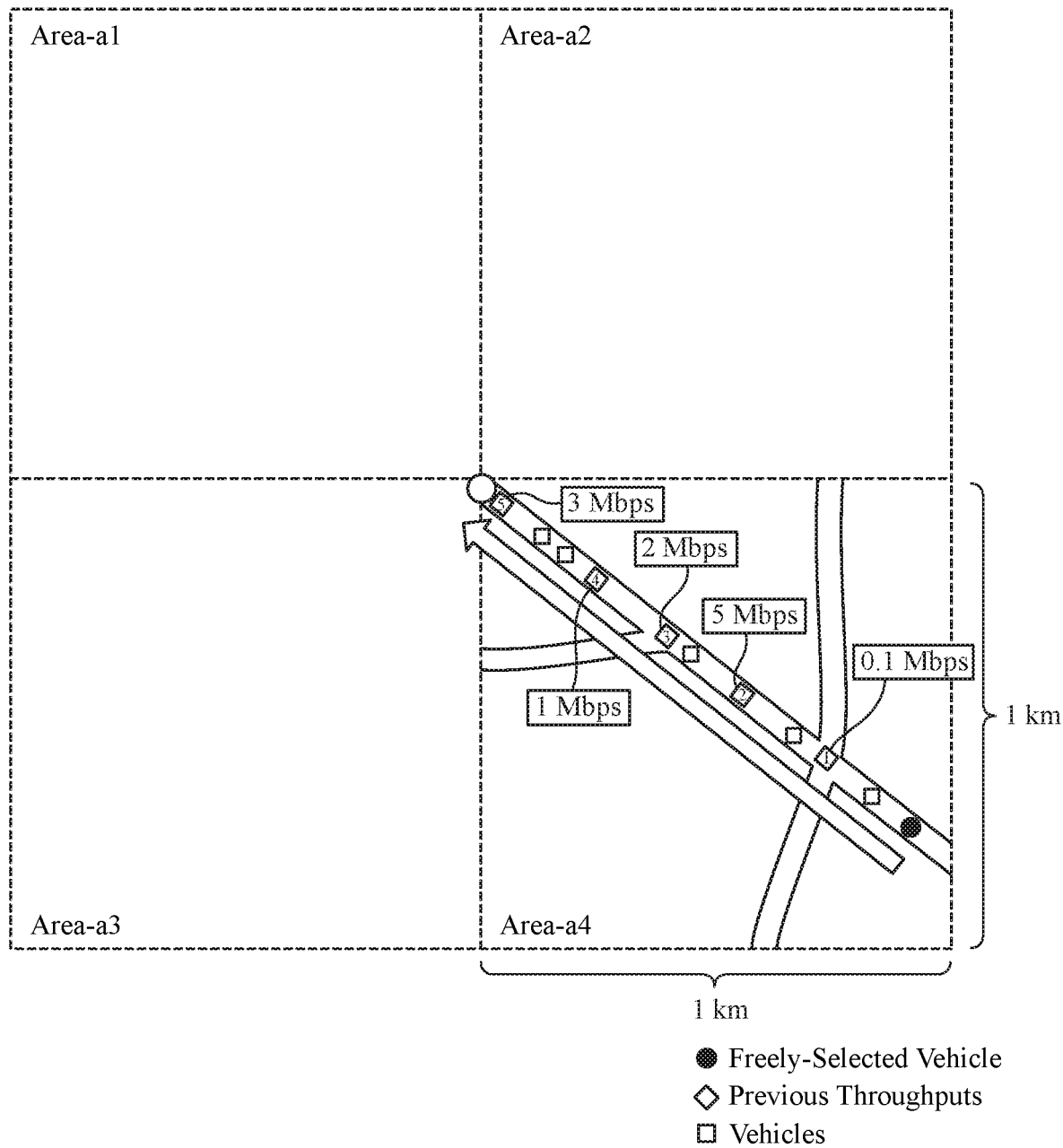
FIG. 11 is a conceptual diagram showing the processing shown by the flowchart of FIG. 10.

FIG. 10 is a flowchart showing processing at the time the vehicular server 3 selects a target vehicle which is to be caused to transmit the common information. Further, FIG. 11 is a conceptual diagram showing that processing. As shown in FIG. 11, according to the server system including the in-vehicle information devices 1, the detection devices 2, and the vehicular servers 3, multiple areas are defined in such a manner that an area on a map is partitioned into, for example, 1-kilometer squares. In FIG. 11, as the multiple areas, Areas-a1 to a4 are shown.

On the basis of the acquisition condition of the common information, and the like, the service execution unit 32 sets an area from which it wants to acquire the common information, as a target area. Here, description will be made assuming that Area-a4 in FIG. 11 is set as the target area.

When the target area is set by the service execution unit 32, the vehicle selection unit 34 produces a selection map of Area-a4 provided as the target area (Step ST60).

For producing the selection map, the vehicle selection unit 34 acquires previous measurement results of throughput which are obtained and corresponding to Area-a4. The throughput is throughput in a direction from the in-vehicle information device 1 toward the vehicular server 3. The reception unit 30 of the vehicular server 3 detects, at every time it receives the vehicle-side information from the in-vehicle information device 1, the throughput at that time, and outputs it together with the received vehicle-side information to the data parser unit 31. While associating the current location indicated in the vehicle-side information and the throughput that are outputted by the reception unit 30, with each other, the data parser unit 31 causes an unshown storage unit to store them. From that storage unit, the vehicle selection unit 34 can acquire the previous measurement results of throughput.

Further, for producing the selection map, the vehicle selection unit 34 acquires destinations, traveling speeds, and current locations of the respective vehicles in Area-a4. Such acquisition by the vehicle selection unit 34 is achievable by using pieces of the vehicle-side information received from the in-vehicle information devices 1.

The vehicle selection unit 34 places the previous measurement results of throughput at their corresponding spots on a map. Further, the vehicle selection unit 34 places the vehicles in Area-a4 at their respective current locations on the map. As the result of this, the selection map is produced.

Subsequently, the vehicle selection unit 34 selects the target vehicle by using the selection map (Step ST61).

A method of selecting the target vehicle by using the selection map is exemplified by a method shown below.

First, the vehicle selection unit 34 sets a spot with the largest throughput in the previous measurement results of throughput, as a target spot. In the example shown in FIG. 11, the spot at which 5 Mbps is indicated in the previous measurement results of throughput is set as a target spot.

Subsequently, using the current locations and the destinations of the respective vehicles, the vehicle selection unit 34 extracts one or multiple vehicles which have not yet passed the target spot but would pass that spot afterwards. Then, the vehicle selection unit 34 freely selects one from among the extracted vehicles.

Subsequently, the vehicle selection unit 34 further extracts from among the extracted vehicles, another vehicle having a traveling speed within ±10 km/h difference from that of the freely-selected one vehicle. The further extracted vehicle at this time and the freely-selected one vehicle are regarded as candidate vehicles.

Subsequently, with respect to each of the vehicles regarded as the candidate vehicles, the vehicle selection unit 34 estimates a throughput that is required when information is transmitted from the in-vehicle information device 1 of the vehicle to the vehicular server 3. For estimation at this time, the number of subscribed services, which means the number of services received by the vehicle, is used. For example, the vehicle selection unit 34 has recorded in the unshown storage unit, an average throughput that is necessary for a service, and estimates the required throughput by multiplying the average throughput by the number of subscribed services. The number of services which the vehicle subscribes to may be acquired by the vehicular server 3, as the vehicle-side information from the vehicle. Instead, it is allowed that the vehicular server 3 acquires specific names of services from the vehicle and then, using averagely-necessary throughputs previously obtained for the respective services, the vehicle selection unit 34 performs the estimation of the throughput.

Subsequently, the vehicle selection unit 34 compares the throughput at the target spot, which is 5 Mbps in the example shown in FIG. 11, with the required throughput estimated for each of the vehicles regarded as the candidate vehicles. Then, the vehicle selection unit 34 ranks the vehicles as the candidate vehicles by a difference value obtained by subtracting the required throughput estimated, from the throughput at the target spot, to thereby select from the candidate vehicles, the vehicle with the largest difference value as the target vehicle.

The throughput is also influenced by the traveling speed of the vehicle. Thus, in a case where vehicles whose traveling speeds are extremely different from each other are regarded as the candidate vehicles, an adequate ranking is unlikely to be achieved when the vehicles as the candidate vehicles are ranked only by the difference value. Thus, in the above description, the candidate vehicles are selected in consideration of their traveling speeds.

The vehicle selection unit 34 notifies the service execution unit 32 about the vehicle selected as the target vehicle (Step ST62). The service execution unit 32 transmits, through the transmission unit 35 to the target vehicle, a transmission request for the common information together with information on the target spot.

It is noted that when the reception unit 30 has received the transmission impossible message from the target vehicle, the vehicle selection unit 34 eliminates that target vehicle from the selection map, and performs the processing in Step ST61 again. For example, the in-vehicle information device 1, when it has received the transmission request for the common information, performs the processing shown in FIG. 9 again, and as a result, when the reception unit 30 has received the transmission impossible message from the target vehicle, the vehicle selection unit 34 eliminates that target vehicle from the selection map. Instead, in the case where, during a predetermined period from a past time to the present, the reception unit 30 already received the transmission impossible message from the target vehicle, the vehicle selection unit 34 may eliminate that target vehicle from the selection map.

Also, when reception of the common information from the target vehicle has failed, the vehicle selection unit 34 eliminates that target vehicle from the selection map, and performs the processing in Step ST61 again. For example, in the case where the required throughput estimated by the vehicle selection unit 34 and an actually-required throughput are largely apart from each other and the actually-required throughput exceeds the throughput at the target spot, or in the case where an unexpected communication failure has occurred, the vehicular server 3 will fail to receive the common information.

Further, with respect to the transmission of the common information from the target vehicle, the in-vehicle information device 1 of the target vehicle may transmit the common information together with the other vehicle-side information at arrival timing at the target spot, regardless of the timing set in the class-setting information. Instead, it is allowed that, on the basis of the acquisition condition of the vehicle-side information, the vehicle selection unit 34 selects as the target vehicle, a vehicle whose transmission timing of a class including the common information would come at around the target spot, and the in-vehicle information device 1 of the target vehicle transmits the common information together with the other vehicle-side information at the timing set in the class-setting information.

Further, multiple target spots may be each set as the target spot. For example, in FIG. 11, a spot with a throughput of 3 Mbps may be set as the target spot in addition to the spot with a throughput of 5 Mbps.

Further, it is suitable that the vehicle selection unit 34 compares the throughput detected by the reception unit 30 in actual communication with a vehicle in Area-a4 set as the target area, with the previous measurement result of throughput used for the production of the selection map and, when there is a difference of 1 Mbps or more, for example, makes the throughput detected by the reception unit 30 in actual communication with the vehicle in the area set as the target area, usable at the time of next production of a selection map of Area-a4.

In this manner, in addition to transmitting each of pieces of vehicle-side information to the vehicular server 3 at the corresponding timing set therefor, the in-vehicle information device 1, when it has determined that the transmission of the common information is impossible, transmits that fact to the vehicular server 3 and does not transmit the common information. This prevents wasteful use of uplink wireless frequency resources due to duplicative transmission of the common information from every vehicle to the vehicular server 3, so that the uplink wireless frequency resources will be used efficiently.

It is noted that, in the foregoing, the in-vehicle information device 1 is exemplified by a navigation device; however, the in-vehicle information device 1 may be a mobile terminal, such as a smartphone and the like, brought inside the vehicle. The mobile terminal is wirelessly connected to the detection device 2 to thereby receive the vehicle-side information.

Further, in the foregoing, the class-setting information is designed to be transmitted from the vehicular server 3 to the in-vehicle information device 1; however, it is allowable to design so that, when the vehicle-side application is installed in the in-vehicle information device 1, the class-setting information is automatically stored by that application in the unshown storage unit in the in-vehicle information device 1. Instead, it is allowable that the in-vehicle information device 1 uses again the class-setting information which was acquired at the last time the vehicle traveled. In this case, at every time the vehicle is stopped from use, for example, by turning-off of the engine, the in-vehicle information device 1 stores the class-setting information at that time in the unshown storage unit.

Further, in the foregoing, the description has been made assuming that the in-vehicle information device 1 transmits multiple pieces of vehicle-side information to the vehicular server 3 and a part of the multiple pieces of vehicle-side information is common information. However, depending on the service, a case is conceivable where only one type of vehicle-side information is required and that one type of vehicle-side information is the common information. Even in this case, the above-described processing by the in-vehicle information device land the vehicular server 3 is applicable, and thus the transmission determination unit 14 in the in-vehicle information device 1 calculates a throughput that is required when the vehicle-side information, which is the only vehicle-side information and also the common information, is transmitted, and uses the throughput to determine whether or not the transmission of the common information is impossible.

Consequently, according to Embodiment 1, the transmission determination unit 14 determines whether or not the transmission of the common information is impossible, and when the transmission is determined to be impossible, the transmission unit 16 transmits the transmission impossible message to the vehicular server 3. Thus, wasteful use of the uplink wireless frequency resources due to duplicative transmission of the common information from every vehicle to the vehicular server 3 is prevented, so that the uplink wireless frequency resources will be used efficiently.

It should be noted that modification of any component in the embodiment and omission of any component in the embodiment may be made in the present invention without departing from the scope of the invention.

INDUSTRIAL APPLICABILITY

The in-vehicle information device according to the invention can efficiently use the uplink wireless frequency resources at the time of transmission of the vehicle-side information, and thus, it is suited for use in a server system for providing a service in which processing is performed using the vehicle-side information.

REFERENCE SIGNS LIST

1: in-vehicle information device, 2: detection device, 3: vehicular server, 10: intra-vehicle reception unit, 11: information accumulation unit, 12: reception unit, 13: class-setting analysis unit, 14: transmission determination unit, 15: information generation unit, 16: transmission unit, 20: condition detection unit, 21: detection-side information generation unit, 22: intra-vehicle transmission unit, 30: reception unit, 31: data parser unit, 32: service execution unit, 33: class setting unit, 34: vehicle selection unit, 35: transmission unit, 101: processing circuit, 102: memory, 103: CPU, 104: intra-vehicle communication device, 105: communication device.

The invention claimed is:

1. An in-vehicle information device for transmitting vehicle-side information collected in a host vehicle to a vehicular server providing a service in which the vehicle-side information transmitted from a plurality of vehicles is processed, where the transmission process minimizes inefficient use of transmission resources from duplicative transmission of redundant information from each the plurality of vehicles, comprising:
a transmitter to individually transmit to a vehicular server, one or multiple pieces of vehicle-side information collected in a host vehicle, at a timing corresponding to a class of transmission timing set for each of the pieces of vehicle-side information;
an intra-vehicle receiver to receive vehicle-side information detected by one or more intra-vehicle sensors, and processing circuitry configured to
acquire the vehicle-side information received by the intra-vehicle receiver from the one or more intra-vehicle sensors;
classify each piece of the acquired vehicle-side information in terms of an associated transmission timing, where an associated transmission timing indicates a frequency for transmission of acquired vehicle-side information for a corresponding classification,
process the acquired vehicle-side information for transmission to the vehicular server by adding information to allow the vehicular server to identify the host vehicle, where the acquired vehicle-side information is processed at a timing in accordance with a classification of the acquired vehicle-side information,
determine whether or not transmission of common information, which is a piece of the vehicle-side information which the in-vehicle information device has been previously notified as being in common with another vehicle, is impossible, by using a throughput that is required when the common information is transmitted, a throughput that is estimated from a communication state with the vehicular server, and a processing load of the in-vehicle information device,
when the transmission of common information is determined to be impossible generate a message indicating that the transmission of the common information is impossible, and
control the transmitter to transmit the processed vehicle-side information including the common information or the processed vehicle-side information excluding the common information and the generated message to the vehicular server,
wherein when the vehicular server receives the message indicating that the transmission of the common information is impossible, the vehicular server reselects from among the plurality of vehicles other than the host vehicle, another target vehicle to transmit the common information.

2. The in-vehicle information device of claim 1, wherein the associated transmission timing is one of information to be periodically transmitted to the vehicular server, information to be transmitted at every time an event occurs in the host vehicle, information to be transmitted at every time contents thereof change, or information to be transmitted at a time an emergency occurs in the host vehicle.

3. The in-vehicle information device of claim 2, wherein pieces of the information to be periodically transmitted to the vehicular server are each further classified in terms of information to be transmitted at intervals of one second or one minute, or information to be transmitted at intervals of one hour or one day.

4. The in-vehicle information device of claim 1, wherein, when the host vehicle receives multiple services in which processing is performed using the vehicle-side information, the class of transmission timing for each of the pieces of vehicle-side information is set individually for each of the services.

5. The in-vehicle information device of claim 4, wherein the transmitter transmits pieces of the vehicle-side information whose transmission timings belong to a same class and which are related to respective different multiple services, together.

6. The in-vehicle information device of claim 1, further comprising:
a receiver to receive, from the vehicular server, notification specifying which information among the pieces of vehicle-side information is the common information.

7. A server system for providing a service to a host vehicle in which the vehicle-side information transmitted from a plurality of vehicles, including the host vehicle, is processed by a server, where the transmission process minimizes inefficient use of transmission resources from duplicative transmission of redundant information from each the plurality of vehicles, the system comprising
a vehicular server including
a receiver to receive from multiple vehicles, vehicle-side information collected in each of the vehicles; and
processing circuitry configured to
select from among the multiple vehicles, a target vehicle which is to be caused to transmit common information, which is a piece of the vehicle-side information in common between the multiple vehicles, by using throughputs previously obtained at respective locations from multiple locations within a predefined area, and a number of services in which processing is performed using the vehicle-side information and which are received by each of the vehicles, and
reselect, when the receiver receives, from the target vehicle, a message indicating that transmission of the common information is impossible, from among the vehicles other than the target vehicle, another target vehicle to transmit common information, and
an in-vehicle information device for transmitting vehicle-side information collected in the host vehicle to the vehicular server comprising:
a transmitter to individually transmit to the vehicular server, one or multiple pieces of vehicle-side information collected in a host vehicle, at a timing corresponding to a class of transmission timing set for each of the pieces of vehicle-side information;
an intra-vehicle receiver to receive vehicle-side information detected by one or more intra-vehicle sensors; and
processing circuitry configured to
acquire the vehicle-side information received by the intra-vehicle receiver from the one or more intra-vehicle sensors,
classify each piece of the acquired vehicle-side information in terms of an associated transmission timing, where an associated transmission timing indicates a frequency for transmission of acquired vehicle-side information for a corresponding classification,
process the acquired vehicle-side information for transmission to the vehicular server by adding information to allow the vehicular server to identify the host vehicle, where the acquired vehicle-side information is processed at a timing in accordance with a classification of the acquired vehicle-side information,
determine whether or not transmission of common information, which is a piece of the vehicle-side information which the in-vehicle information device has been previously notified as being in common with another vehicle, is impossible, by using a throughput that is required when the common information is transmitted, a throughput that is estimated from a communication state with the vehicular server, and a processing load of the device,
generate, when the transmission is determined to be impossible, a message indicating that the transmission of the common information is impossible, and control the transmitter to transmit the processed vehicle-side information including the common information or the processed vehicle-side information excluding the common information and the generated message to the vehicular server, wherein when the vehicular server receives the message indicating that the transmission of the common information is impossible, the vehicular server reselects from among the plurality of vehicles other than the host vehicle, another target vehicle to transmit the common information.

8. An information transmission method for an in-vehicle information device to transmit vehicle-side information collected in a host vehicle to a vehicular server providing a service in which the vehicle-side information transmitted from a plurality of vehicles including the host is processed, the method comprising:
receiving, by an intra-vehicle receiver, vehicle-side information detected by one or more intra-vehicle sensors;
classifying each piece of the received vehicle-side information in terms of an associated transmission timing, where an associated transmission timing indicates a frequency for transmission of acquired vehicle-side information for a corresponding classification;
processing the acquired vehicle-side information for transmission to the vehicular server by adding information to allow the vehicular server to identify the host vehicle, where the received vehicle-side information is processed at a timing in accordance with a classification of the acquired vehicle-side information;
determining whether or not transmission of common information, which is vehicle-side information which the in-vehicle information device has been previously notified as being in common with another vehicle, is impossible, by using a throughput that is required when the common information is transmitted, a throughput that is estimated from a communication state with the vehicular server, and a processing load of the device;
generating, when the transmission is determined to be impossible, a message indicating that the transmission of the common information is impossible; and
transmitting the processed vehicle-side information including the common information or the processed vehicle-side information excluding the common information and the generated message to the vehicular server.

* * * * *